May 1, 1973     L. A. A. LEFRANCOIS     3,730,883
SEWAGE DISPOSAL METHOD
Filed Feb. 5, 1971
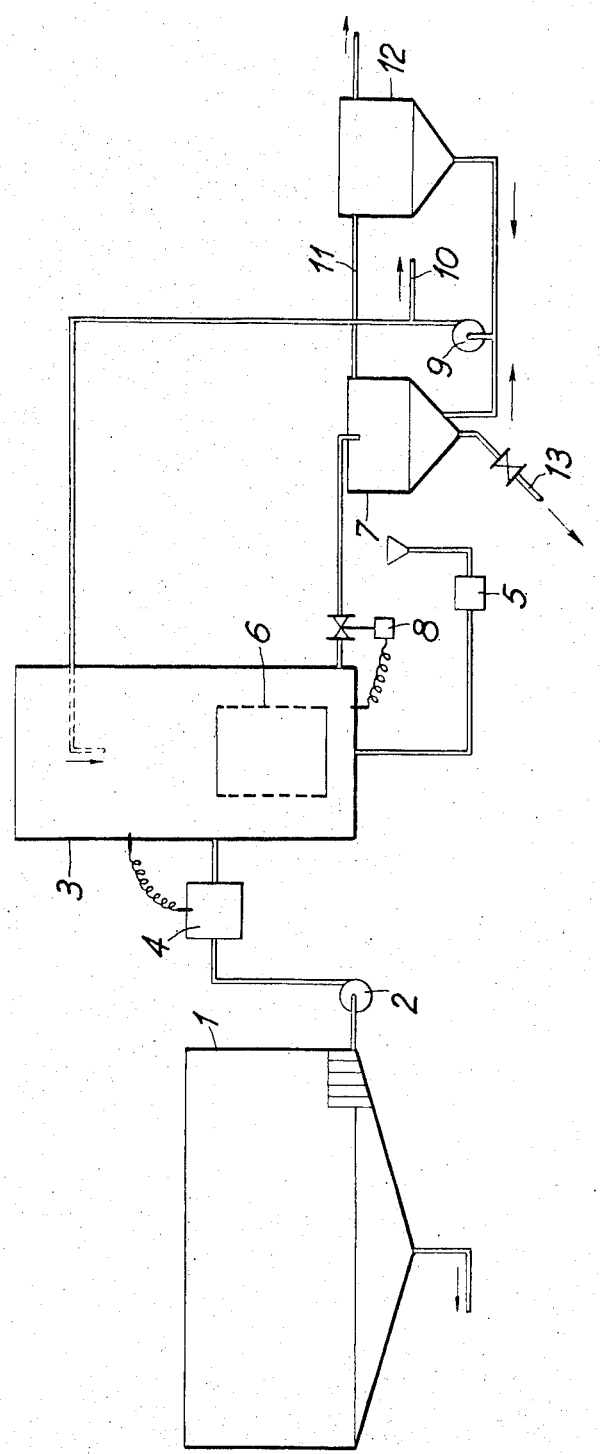

United States Patent Office

3,730,883
Patented May 1, 1973

3,730,883
SEWAGE DISPOSAL METHOD
Louis Alfred Auguste Lefrancois, 24 Rue Barbet de Jouy, Paris, France
Filed Feb. 5, 1971, Ser. No. 112,901
Claims priority, application France, Feb. 13, 1970, 7005278; Jan. 15, 1971, 7101317
Int. Cl. C02c 1/06
U.S. Cl. 210—7                                    17 Claims

ABSTRACT OF THE DISCLOSURE

In the treatment of waste waters, or sewage disposal process, according to the activated sludge and aërobial fermentation treatment method, the water to be cleaned is introduced continuously into a fermentation apparatus with a constant output while blowing air continuously into this apparatus in order to keep throughout the liquid mass a substantial homogeneity of the liquid, solid and gaseous phases and ensure a maximum dispersion of the microorganisms, under constant medium conditions, air being blown into the apparatus for transforming the liquid mass into a constant volume of expanded liquid, notwithstanding variations in the liquid composition, the content of living microorganisms in the mass being increased by the addition of similar organic substances up to a predetermined rate kept to a constant value, the liquid more or less loaded with organic substances such as activated sludge being removed from the apparatus in order to keep therein a constant mass of treated liquid.

FIELD OF THE INVENTION

The present invention relates to a continuous method of treating used waters loaded with organic substances in order to purify the water by using sludge activated in aerobiosis.

The problems of sewage disposal or purification of used waters are extremely varied; therefore, the methods proposed and used to this end are very numerous and in many cases they differ widely from one another; some known processes utilize activated sludge, i.e., processes in which microbial colonies are developed or grown by aerobic fermentation, these colonies producing sludge which, after settling, can be recycled at least in part; in most instances these processes are so conducted that one fraction of the colony is kept in the form of a bed on which the liquid is caused to trickle; in other cases it is endeavoured to maintain in the fermenting liquid suspensions of agglomerates consisting of microorganisms and organic substances called "floc." These methods are generally rather slow, involve very bulky plants and, furthermore, give rise to difficult problems for discharging and treating excess sludge.

SUMMARY OF THE INVENTION

The present invention is applicable to the treatment of sewage and other waste liquids from agricultural and food industries but should not be construed as being strictly limited to this specific field. It provides a method whereby the activity and rate of operation of residual water treatment steps can be increased by subjecting the sewage liquid in a suitable fermenting vessel to an aeration and agitation considerably more intense than in hitherto known activated-sludge processes, notably by maintaining in suspension the purifying micro-organisms which are therefore considerably more efficient and by eliminating during the purifying process, any deposit, settling or agglomeration, even moderate, of activated sludge, and more particularly any building up of "floc" hitherto considered as very desirable in conventional processes.

To this end, the method according to the present invention for the treatment of waters loaded with organic substances with a view to purifying them with the assistance of activated sludge subjected to aërobic fermentation is characterized in that the sewage liquid is introduced continuously into a fermentation apparatus in order to preserve throughout the liquid mass a convenient homogeneity of the solid, liquid and gaseous fractions, and to ensure a maximum dispersion of the microorganisms, that constant medium conditions are maintained in the fermentation apparatus, that the volume of liquid contained in the fermentation apparatus is converted by blowing air into this apparatus, that the contents of living organic substances are increased by the addition of similar organic substances up to a predetermined rate kept at a constant value, and finally that the liquid, more or less loaded with organic substances, such as activated sludge, is drawn off continuously from the fermentation apparatus, in order to maintain a constant mass of treated liquid in the apparatus.

The organic and inorganic ingredients necessary for improving the metabolism of the various microorganisms may be introduced continuously or batchwise into the fermentation apparatus. Preferably, the rate of insufflation air ranges from about 0.2 to 2.0 cubic meters/minute/cubic meter of unexpanded liquid; it is calculated from the flow conditions and oxygenation of the medium. The liquid more or less loaded wtih organic substances is drawn off from the fermentation apparatus according to a theoretically constant output. The sludge is recycled in the fermentation apparatus in order to obtain at the same time the digestion thereof.

With the method of this invention the microorganisms, as well as the oxygen and the other gases are dispersed as completely as possible throughout the liquid mass. Under these conditions the aeration is particularly intense, thus reducing appreciably the necessary contact time; notwithstanding the unavoidable irregularities of the ecology of this system, it is possible to maintain a constant and sufficiently regular development of the working beds by adjusting, automatically or not, the parameters available, in order to maintain a continuous and permanent treatment in a substantially homogeneous medium in which the dissolved oxygen is present at all points at a rate sufficient to ensure a continuous, regular and rapid destruction of the greater part of the impurities.

The parameters to be adjusted, automatically or not, in addition to the input rates, including the aeration, are mainly the temperature and weight of the liquid undergoing the treatment and the weight of the biological mass.

This biological mass may be maintained in the fermentation apparatus at a suitable concentration rate mainly by preserving the biochemical conditions but also by the addition, at a selected rate adjusted automatically or not, of activated sludge separated from the drawing off liquid; this separation may be obtained through any known means, such as natural settling, centrifugtaion, filtration, it being understood that these means are given by way of example, not of limitation.

According to a specific feature characterizing this invention the concentration can be kept at a rate considerably higher than that obtaining through the natural development of microbial colonies within a given time period; in fact, it was found that by gradually increasing the rate of sludge re-use by recycling, the activated-sludge contents of the mass treated in the fermentation apparatus tend to rise to a maximum value depending on the treatment conditions provided in the fermentation apparatus, notably the recycling output, the actual composition of the water to be treated, the specific medium conditions, the aeration rates and flow rates.

Moreover, by recycling in the fermentation apparatus the whole of the activated sludge separated from the purified liquid it was found that the activated sludge concentration in the fermentation apparatus firstly increases, and then, all other parameters remaining constant, attains a stable limit. This limit depends notably on the selected parameters, the contents of organic substances in the water to be purified, and on the recycling output. In other words, under these conditions, a practically complete self-consumption of all the microorganisms developing in the fermentation apparatus is obtained. Therefore, no sludge is to be evacuated except for a few draining operations to be accomplished from time to time for eliminating the inorganic impurities. Now this constitutes an advantageous feature of this invention and a considerable improvement over prior art processes in which costly additional means must be provided for eliminating the excess activated sludge.

It was also ascertained that the choice of optimum medium conditions for developing the microorganisms, notably from the point of view of temperature, was a very important factor for obtaining a rapid purification, the optimum temperature ranging from about 12° to about 40° C. according to the microorganisms utilized.

The process according to this invention is therefore adapted to maintain in a perfect condition within the fermentation apparatus, a very high content of microorganisms having an intense activity. On the other hand, this activity may be evidenced by the proportioning of the resulting dehydrogenase. This exoenzyme secreted by the microorganisms is used for testing the activity of the activated sludge; in known processes a production of over 16 is considered as very satisfactory. The measurements made in the practical embodiment of the method of this invention proved that the dehydrogenase production in the fermentation apparatus ranged from about 40 to about 100.

The fermentation apparatus utilized for carrying out the method of this invention may preferably be selected with a view to cause the incoming liquid or sewage to be subjected to a circulation permanent, regular, properly directed, accelerated or not by the use of mechanical means and during which the metabolism cycles remain as constant as possible, and such that the liquid, by virtue of a constant aeration, remains at a relatively high expansion rate and constitutes a divided mass having considerable and practically permanent exchange surface areas. A fermentation apparatus of this character is described and illustrated notably in the French Pats. Nos. 1,056,594 and 1,373,751.

BRIEF DESCRIPTION OF THE DRAWINGS

A typical and exemplary form of embodiment of the invention is described hereinafter by way of illustration but not of limitation with reference to the single figure of the attached drawing showing a general diagram of a plant for carrying out this invention in the specific case of the treatment of waste sludge from sugar-beet mills.

DESCRIPTION OF THE PREFERRED EMBODIMENT

The sludge is caused to settle beforehand in a settling tank 1 and grit is removed therefrom. Then it is fed by means of a constant-output pump 2 to a fermentation apparatus 3 of known type, in which a controlled circulation is maintained, after passing through a heat exchanger 4 adjusted automatically to keep the temperature selected for fermenting the liquid to be purified.

An air blower 5 directs its output into this apparatus 3 towards the axis of a cylinder 6 and maintains therein a constant circulation of incoming water expanded by aeration.

The aerated, sludge-loaded liquid is drawn continuously and directed into a settling vessel 7, the output from apparatus 6 being adjusted automatically by means of a device 8 adapted to maintain at a constant value the weight of treated liquid in the fermentation apparatus 3.

The sludge settled in vessel 7 is recycled in fermentation apparatus 3 via a pump 9, a branch pipe line 10 being provided for discharging the sludge, if necessary.

A drain pipe 13 provided with a control valve permits of draining continuously or batchwise the excess inorganic sludge.

The purified and clarified liquor flows out through duct 11 and may advantageously be clarified again in another vessel 12, the concentrated effluent being recycled therefrom.

In a semi-industrial plant comprising a fermentation apparatus 3 about 26 feet high, having an inner diameter of 63″, 2,000 litres per hour of sugar-mill sludge have been treated.

The temperature was kept at 20° C.; the aeration rate was 0.55 cubic meter/minute/cubic meter of unexpanded liquid.

The sludge concentration in the fermentation apparatus rose to a limit of the order of 40 grams per litre of dry substances. The residence time of the liquid in the fermentation apparatus was about 4 hours. Under these conditions, 92% of the residual or waste water was purified, corresponding to a DCO purification of the order of 10 kilograms of oxygen per hour.

If desired, the sewage disposal may be somewhat reduced by using the method of this invention, involving a certain power consumption, with a view to reduce labour time and therefore costs; in this case the purification may be completed in a complementary apparatus according to a known process.

Thus, for example, the purification with the process of this invention could be discontinued when a DCO or DBO value of the order of 500 to 1,000 is attained, a kind of finishing apparatus being subsequently used for attaining a rate of 50 to 100, since this invention might prove relatively uneconomical in this range and in the case contemplated hereinabove.

It is clear that the treatment method of this invention affords a high rate of purification by using an equipment of relatively reduced size; its component elements may be operated fully automatically, and a very high cleaning rate attended by a very considerable reduction in the volume of residual activated sludge may be obtained.

The method of this invention is extremely advantageous notably for the treatment of highly-loaded sewage waters since it permits of treating directly, without any preliminary dilution, waters having a DBO value as high as, or even well above, 10,000.

Another advatageous feature characterizing this invention is that it can be interposed very easily and without any inconvenience in another sewage disposal circuit in order to improve the efficiency of this circuit. Thus, by way of example, this procedure may be applied in works or mills requiring for various reasons the re-use of their polluted waters. It will be seen that the insertion of the method of this invention in the circuits utilizing the water will permit, by virtue of the purification of the recycled water, of simplifying and making more economical the complete circuit in which the water is recycled. This example refers notably to the cleaning of sugar-mill sludge from which the purified water can be recycled immediately without any preliminary storage.

What I claim is:

1. Method of treating water loaded with organic substances in order to purify the water by using activated sludge subjected to an aerobial fermentation, comprising: continuously introducing water loaded with organic substances into a fermentation apparatus; continuously blowing air into said fermentation apparatus in order to maintain throughout the liquid mass a substantial homogeneity of the solid, liquid and gaseous fractions and to effect a maximum dispersion of the microoragnisms by air-blowing the liquid into a constant volume of expanded liquid undergoing substantially no variation as the liquid composition varies; adding similar organic substances to the liquid in said fermentation apparatus until a preselected rate is obtained and thereafter maintaining said rate at a constant value; maintaining constant the medium conditions in said fermentation apparatus; and drawing the liquid more or less loaded with organic substances such as activated sludge from the fermentation apparatus at a rate sufficient to keep a constant mass of liquid subjected to the treatment in said fermentation apparatus.

2. Method according to claim 1, including separating at least a part of the activated sludge issuing from the fermentation process from the liquid mass and recycling the separated part through said fermentation apparatus where it is mixed with the liquid undergoing the treatment.

3. Method according to claim 2 including increasing the contents of living organic substances of the mass undergoing the treatment in said fermentation apparatus to the maximum value consistent with the working conditions prevailing in said apparatus, notably the composition of the liquid to be cleaned, the medium conditions, the aeration and flow conditions and rates, said maximum value being obtained by recycling the whole or part of the activated sludge recovered from subsequent separation steps.

4. Method according to claim 2, wherein said separating and recycling occur wholly in the fermentation apparatus in which the concentration of activated sludge attains a stable limit, so that a substantially complete self-consumption of the microorganisms developed therein is obtained, thus eliminating the step of discharging the sludge, except for a few draining operations conducted at spaced time intervals on very moderate amounts of sludge.

5. Method according to claim 2, wherein the activated sludge is separated by simple sedimentation and then reintroduced into said fermentation apparatus.

6. Method according to claim 2, wherein the sludge is separated through separation processes utilizing mechanical means.

7. Method according to claim 2, wherein said separating step is carried out before the removal of the purified and clarified liquor from said fermentation apparatus.

8. Method according to claim 1, including maintaining said fermentation apparatus at an optimum temperature for developing the treatment microorganisms, this optimum temperature being in the range of 12° to 40° according to the specific microorganisms utilized.

9. Method according to claim 1, wherein said step of blowing air into said fermentation apparatus comprises aerating the liquid mass at a rate of 0.2 to 2 cubic meters per minute per cubic meter of expanded liquid to prevent all solid, liquid and gaseous fractions from separating from one another by gravity when the excess gas is expelled.

10. Method according to claim 9, wherein said aerating step effects a sufficient flow rate throughout the treated mass and a maximum dispersion rate of the microorganisms, to set the medium conditions for the proper development of said microoganisms whereby a very high content of activated sludge having an intense activity determinating inner alia a high dehydrogenase production is maintained in said fermentation apparatus.

11. Method according to claim 9, including circulating the liquid in the fermentation apparatus under aerobic conditions by blowing-in air.

12. Method according to claim 1, wherein said step of adding organic substances comprises adding the ingredients necessary for promoting and maintaining at the desired values all the parameters controlling the fermentation process so that the medium approaches as closely as possible that ensuring the highest rate of development of the treatment microorganisms.

13. Method according to claim 1, including automatically adjusting the operating variables so as to avoid substantially completely any manual intervention.

14. Method according to claim 1, characterized in that in the specific case of the treatment of polluted water from sugar-mills air is blown at the rate of 0.5 to 0.6 cubic meter per minute per cubic meter of unexpanded liquid, that the concentration of activated sludge in the fermentation apparatus is maintained between 25 and 50 grams/litre (dry), the temperature in the tank being maintained between 15 and 35° C.

15. Method according to claim 1, including discontinuing the operation before it is completed for example when the DBO or DCO value attained is of the order of 500 to 1,000 and then completing the operation through other means.

16. Method according to claim 1, including connecting a re-use circuit to said fermentation apparatus so that the whole or part of the waste waters from said re-use circuit can be treated in order to reduce their contents or organic substances.

17. Method according to claim 16, characterized in that the re-use circuit is that of the sugar-mill sludge.

References Cited
UNITED STATES PATENTS

| | | | |
|---|---|---|---|
| 3,560,376 | 2/1971 | Heil | 210—7 |
| 3,607,737 | 9/1971 | Gamer | 210—15 |
| 3,354,082 | 11/1967 | Dubach | 210—7 X |
| 3,444,076 | 5/1969 | Sekikawa et al. | 210—15 X |
| 3,412,017 | 11/1968 | Abson et al. | 210—7 |

MICHAEL ROGERS, Primary Examiner

U.S. Cl. X.R.

210—11, 12